United States Patent Office 3,276,281
Patented Oct. 4, 1966

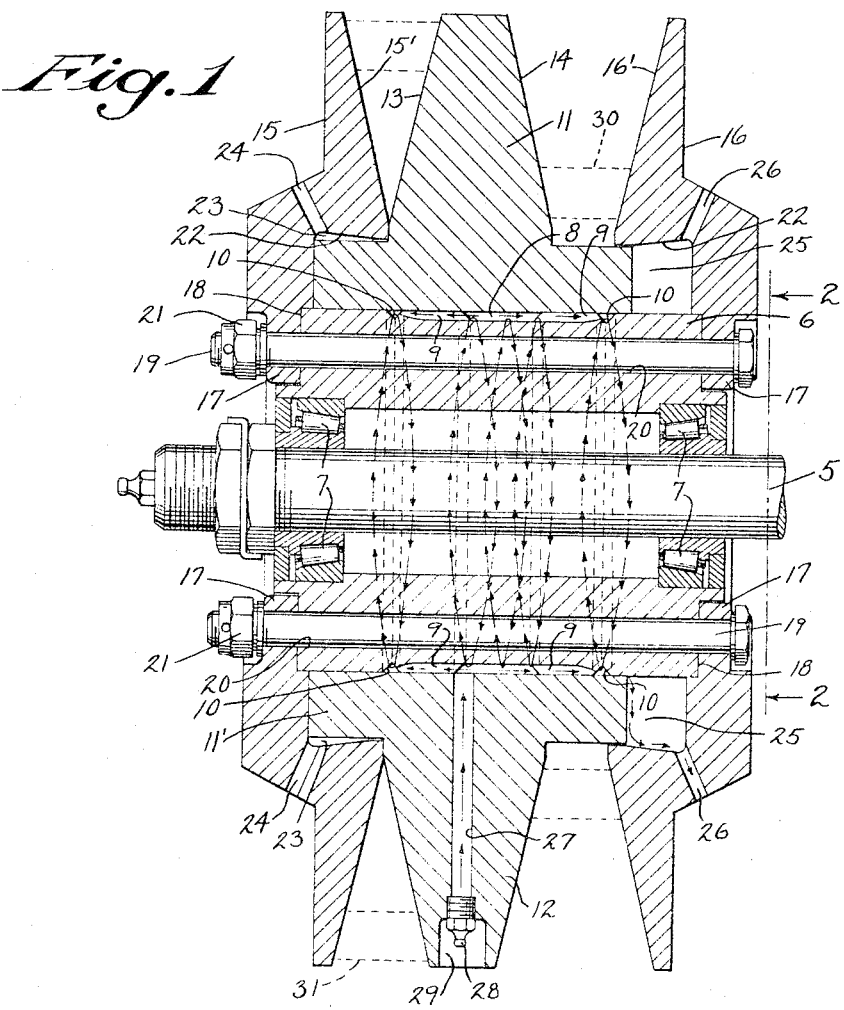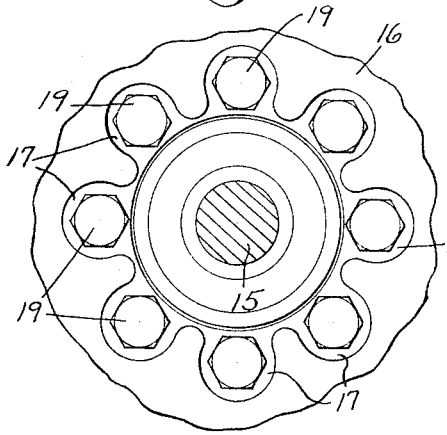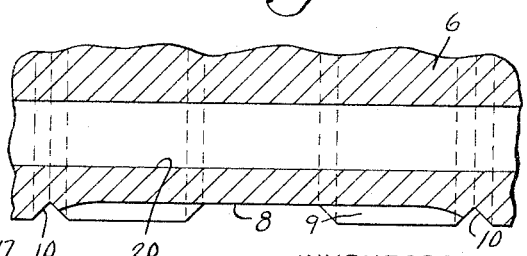

3,276,281
VARIABLE SPEED TANDEM DRIVE PULLEY ASSEMBLAGES
Wilmer E. Witt and Eugene A. Sousek, Appleton, Wis., assignors to Fox River Tractor Company, Appleton, Wis., a corporation of Wisconsin
Filed Mar. 17, 1964, Ser. No. 352,447
4 Claims. (Cl. 74—230.17)

This invention relates to improvements in variable speed tandem drive pulley assemblages.

Many types of variable speed tandem drive pulley devices are available for various industrial and agricultural implement usages. Basically, a variable speed tandem drive pulley assemblage may include a pair of fixed end flanges with a relatively movable sheave or pulley element therebetween, all mounted on a central hub which turns about an axial shaft on interposed bearings. Means must be provided for lubricating the movable elements of the assemblage, and in standard structures of the type under consideration the introduction of lubricant was such that the lubricant was free to work its way outwardly into the belt-receiving grooves of the sheaves, which is objectionable in that lubricant in these areas would cause belt slippage and deterioration of the belt covers.

With the foregoing in mind it is a primary object of the present invention to provide, in a variable speed tandem drive pully assemblage having a channeled hub into which lubricant is introduced, circumferential grooves in the hub which receive lubricant from the hub channel, together with outwardly angled discharge ducts in the sheave end flanges through which excess lubricant may be discharged free of the sheave belt grooves, should excess lubrication over-tax the capacity of the channels and grooves.

A further object of the invention is to provide lubricating means for a variable speed tandem drive pulley assemblage wherein introduced lubricant will enter an annular channel formed in the pulley hub and circulate completely around the hub and through laterally extending channels into spaced circumferential grooves, there being wells formed between the ends of the hub and inner surface portions of the end sheave flanges, to receive any excess lubricant which can be discharged free of the sheave belt-grooves by outwardly directed ducts in said end flanges.

A further object of the invention is to provide lubricating means for a variable speed tandem drive pulley assemblage wherein release of the lubricant will always be remote from the sheave grooves and belts, and wherein the lubricating-receiving grooves and channels are always open and registrable regardless of the relative position of the hub and center sheave element.

A further object of the invention is to provide, in a variable speed tandem drive pulley assemblage, lubricating ducts and grooves which confine the lubricant and are not exposed to open contamination.

A further object of the invention is to provide a variable speed tandem drive pulley assemblage which is of simple construction, in which the components may be easily and accurately assembled with assured concentricity, which is efficient in its operation, which is strong and durable, which provides for the effective lubrication of moving parts while preventing flow of excess lubricant into sheave grooves and onto belt surfaces, and which is well adapted for the purposes described.

With the above and other objects in view, the invention consists of the improved variable speed tandem drive pulley assemblage, and its parts and combinations as set forth in the claims, and all equivalents thereof.

In the accompanying drawing, in which the same reference characters indicate the same parts in all of the views:

FIG. 1 is a vertical sectional view through the improved variable speed tandem drive pulley assemblage;

FIG. 2 is a fragmentary end view of the assemblage and outer face of one of the sheave flanges, said view being taken approximately along line 2—2 of FIG. 1; and FIG. 3 is an enlarged fragmentary detail sectional view of the sheave mounting hub showing the lubricant grooves and channels.

Referring now more particularly to the drawing, it will appear that the improved variable speed tandem drive pulley assemblage includes a central axial shaft 5 on which a hollow hub member 6 is rotatably mounted by means of interposed bearings 7. The outer surface of the hub 6, intermediate its ends, is formed with an annular lubricant channel 8 which communicates at its ends with pairs of laterally extending channels 9, which pairs of channels are diametrically separated. Communicating with the channels 9 are a pair of spaced apart circumferential grooves 10 formed in the outer wall portion of the hub 6.

Axially slidably mounted on the hub 6 is an intermediate sheave element 11 having a hub portion 11' of less length than the hub 6 on which it is mounted and having an annular rib 12 whose opposite outer faces 13 and 14 are inclined as shown to form cooperating sheave faces, as will hereinafter appear.

The numeral 15 indicates a sheave end flange for the left-hand end of the assemblage relative to FIG. 1, and the numeral 16 indicates a sheave flange for the right-hand end of the assemblage relative to FIG. 1. Each end flange 15 and 16 has its central plate portion formed with spaced apart radial lugs 17 which are provided with bolt openings.

In the assembled condition of the variable speed tandem drive pulley the shaft 5 carries the hub 6, as before mentioned, with the interposed bearings 7. The hub portion 11' of the intermediate sheave element 11 is axially slidably mounted on the hub 6 and then the assemblage is completed by mounting on the hub the opposite sheave-forming end flanges 15 and 16 whose spaced apart radial lugs are received within angled recesses 18 formed within the opposite ends of the hub 6. Thus the axial location of the sheave and flanges 15 and 16 is made positive and the sheave end flanges 15 and 16 are rigidly secured to the hub 6 by means of a plurality of elongated headed bolts 19 which extend through the openings in the end flange lugs 17 and also through registering bores 20 provided therefor in the hub 6. The threaded ends of the bolts 19 carry nuts 21 whereby the assembly is made secure.

It should be observed that the inner face portions 15' and 16' of the sheave end flanges 15 and 16, which are complementary to the sheave element faces 13 and 14, respectively, are inclined or tapered oppositely relative to the faces 13 and 14 and thus form sheave belt grooves which are progressively enlarged toward the outer ends of the sheave elements. The surface portion of each sheave end plate 15 and 16 adjacent an end of the element hub 11' is substantially right-angular in form, with one face of the right angle being slightly outwardly inclined, as at 22.

It will be seen from FIG. 1 that the limited length of the hub portion 11' of the intermediate sheave element 11 permits said sheave element 11 to move axially on the hub 6 and, when it is in the position shown in FIG. 1, the sheave groove formed by the cooperating faces 13 and 15' is of reduced depth relative to the belt groove formed between the sheave faces 14 and 16'. Also, the end of the hub 11' of the sheave element 11 abuts the adjacent sheave end plate 15 with the inclined face 22 providing, around that end of the hub portion 11' a restricted lubricant passage 23 which communicates with a plurality of lubricant discharge ducts 24 which extend angularly outwardly through the adjacent web portion of the sheave end plate 15. However, in this position of the intermediate sheave element 11 the right-hand end wall of the element hub 11' (relative to FIG. 1) is spaced substantially away from the angular corner of the end flange 16 and thus provides an enlarged lubricant well 24 in which excess lubricant may collect and which can be discharged by centrifugal force to the atmosphere via outwardly angled discharge ducts 26 in the web portion of the end plate 16. It should be noted that the outwardly angle lubricant discharge ducts 24 and 26 are so arranged that any excess lubricant that is discharged from the assembly to the atmosphere is discharged away from or exteriorly of the sheave faces 15', 13, 16' and 14, and thus no excess lubricant will ever find its way into the sheave belt groove and lodge thereon or flow onto the belts and cause deterioration of the same.

In further respect to the novel lubrication arrangement for the variable speed tandem drive pulley assemblage, it will be observed that the intermediate sheave element 11 is formed with a radial bore 27 carrying a lubricant fitting 28 within a recess 29 therefor in a rim 12 of the intermediate sheave element 11. Lubricant, such as grease, is forced under pressure through the radial bore 27, into the hub channel 8, and will circulate completely around the hub and disperse through the several axial channels 9 and from thence into the annular grooves 10, the circulation of the lubricant around the hub and between the surfaces of the hub 6 and hub portion 11' being in the manner shown by the arrows in FIG. 1. Should excessive grease be added beyond the capacity of the channels 8 and 9 and grooves 10, grease will flow out between the contacting surfaces of the hubs 6 and 11', tending, because of centrifugal force, when the assemblage is revolving, to be thrown outwardly. This excess grease will flow toward the outer ends of the sheave hub 11' and will fill up the annular well 25 (if the sheave element 11 is in its left-hand position relative to FIG. 1), or if the sheave element 11 is moved toward the right relative to FIG. 1 and opens up a corresponding well at the left-hand end of the sheave hub 11', the grease will fill such well. In either event, excess grease in the well 25 will be discharged outwardly through the ducts 26 and, with respect to that end of the hub 11' which closes its well, some excess grease can be forced outwardly between the inclined wall 22 and the surfaces of the hub 11' for discharge through ducts 26.

As was previously mentioned, the improved variable speed tandem drive pulley is such that it is susceptible of very easy and accurate assembly. The hub 6 is mounted on the shaft 5 with the interposed bearings 7. Then the intermediate sheave element 11 is slid onto the outer cylindrical surface of the hub 6 and thereafter the end sheave plates 15 and 16 are slipped onto opposite ends of the assemblage and their positions are accurately determined by the interengagement of the coacting shouldered portions 18 at the ends of the hub 6 and the flanges 17 on the end plates 15 and 16. The plurality of bolts 19 are then inserted and thus all of the elements of the tandem drive pulley are accurately assembled and secured in their proper positions.

The improved variable speed tandem drive pulley assemblage may find utility in various fields. By way of example, it may be used in connection with an agricultural implement such as a self-propelled forage harvester, and is mounted so as to be oscillated. In operation, the pulley assemblage, when rocked in one direction, will cause a tightening up of the driving belt 30 so that it will force its way downwardly in the sheave groove formed between the faces 14 and 16' with such disposition of the belt 30 causing the intermediate sheave element to move to the left relative to FIG. 1, which restricts or narrows the belt groove between the sheave faces 13 and 15' and thereby causes the primary or driven belt 31 to move outwardly in its sheave groove. A reverse oscillation of the pulley assemblage will, of course, tighten up on the primary belt 31 and cause it to move down in its sheave groove and slide the intermediate sheave element 11 toward the right relative to FIG. 1, thereby reducing the depth of the sheave groove between the faces 14 and 16' and causing the driving belt 30 to move outwardly in its sheave groove whereby variable speeds are imparted to the driven implement.

The manner in which the improved assemblage is lubricated has heretofore been discussed and during operation of the assemblage, when lubricant has been introduced via the duct 27 and various channels, such lubricant will flow through the channels 8 and 9 and ducts 10 and ensure effective lubrication of the relatively moving surfaces. As before mentioned, should excess lubricant fill the channels it will, through centrifugal force, be deposited into an annular well 25 from hence it will be centrifugally discharged exteriorly of the assemblage through the ducts 26. The latter are so located that this excess discharged lubricant cannot find its way into the sheave grooves, which is the undesirable situation in respect to conventional variable speed tandem drive pulley assemblages. Hence, the sheave grooves are maintained free of grease and deterioration of the belts thereby is eliminated.

The improved variable speed tandem drive pulley assemblage is of simple and novel construction and is well adapted for the purposes described.

What is claimed as the invention is:

1. In a pulley assemblage including a shaft and a hub revolubly mounted thereon, a pair of sheave elements carried by the hub and formed with juxtaposed, outwardly inclined faces to form a variable depth belt groove, one of the sheave elements being axially movable on the hub and the other being fixed, the axially movable sheave element being formed with a radial lubricant introducing bore and an intermediate surface portion of the hub being formed with an annular channel, lateral channels communicating with the first mentioned channel, and annular grooves communicating with the lateral channels, the inner end of said sheave element lubricant introducing bore registering with said annular channel in any axially shifted position of said axially movable sheave element, there being an excess lubricant discharge duct extending through the fixed sheave element to discharge outwardly of the exterior face of said sheave element remote from its inclined belt groove forming face, adjacent surfaces of the sheave elements radially outwardly of an end portion of the hub being shaped to form a variable size well when the movable sheave element is shifted axially away from the other sheave element and into which the inner end of the excess lubricant discharge duct opens, said well accommodating excess lubricant which may seep from the channels and grooves axially outwardly along the surface of the hub.

2. In a pulley assemblage including a shaft and a hub revolubly mounted thereon, a pair of end sheave elements fixedly carried by opposite end portions of the hub and having annular flanges whose inner faces are outwardly inclined, an intermediate sheave element axially movably mounted on the hub between said end sheave elements and having an annular flange whose outer faces are inclined oppositely to the inclination of the adjacent faces of the end sheave elements to form therewith variable depth belt grooves, and the axially movable intermediate sheave element being formed with a radial lubricant introducing bore and an intermediate surface portion of the hub being formed with an annular channel, lateral channels communicating with the first mentioned channel, and with annular grooves communicating with the lateral channels, the inner end of said sheave element lubricant introducing bore registering with said annular channel in any axially shifted position of said axially movable intermediate sheave element, there being excess lubricant discharge ducts extending outwardly through the fixed sheave elements to discharge excess lubricant outwardly of the exterior faces of said sheave elements exteriorly of their belt grooves, inner surfaces of the end sheave elements being formed as wells variably entered by end portions of the intermediate sheave member during axial movements of the latter and into which the inner end of the excess lubricant discharge ducts opens, said wells accommodating excess lubricant which may seep from the channels and grooves axially outwardly along the surface of the hub.

3. In a pulley assemblage including a shaft and a main hub revolubly mounted thereon, a pair of end sheave elements fixedly carried by opposite end portions of the main hub and having annular flanges whose inner faces are outwardly inclined, inner, intermediate face portions of the end sheave elements radially of said hub being pocketed, an intermediate sheave element having a hub portion of less length than the main hub axially movably mounted on the main hub between said end sheave elements with the ends of the intermediate sheave element hub being movable into and out of said pockets, said intermediate sheave element having an annular flange whose outer faces are inclined oppositely to the inclination of the adjacent faces of the end sheave elements to form therewith variable depth belt grooves, there being excess lubricant discharge ducts extending outwardly through the fixed sheave elements and communicating at their inner ends with said pockets to discharge excess lubricant outwardly of the exterior faces of said sheave elements exteriorly of their belt grooves, and means for introducing lubricant between the annular contacting surfaces of said main hub and the intermediate sheave element hub including a radial bore formed in the axially movable sheave element, excess lubricant being flowable along said surfaces to said pockets for discharge therefrom.

4. In a variable speed tandem drive pulley assemblage including a shaft and a main hub revolubly mounted thereon, a pair of end sheave elements fixedly carried by opposite end portions of the main hub and having shouldered flanges in endwise abutment with the ends of the main hub, an intermediate sheave element having a secondary hub of less length than the main hub axially movably mounted on the main hub between said end sheave elements, the ends of said secondary hub being shiftable relative to the shouldered flanges of the end sheave elements to form pockets of varying capacity, channel and groove means for introducing lubricant between the surfaces of the main and secondary hubs with excess lubricant being forced into said pockets, said means including a radial bore formed in the axially movable sheave element, and ducts in the outer flanges of the end sheave elements for by-passing excess lubricant to the exterior of the end sheave elements.

References Cited by the Examiner

UNITED STATES PATENTS 2,131,247  9/1938  Winter _____ 74—230.17

FOREIGN PATENTS 764,844  1/1957  Great Britain.

DAVID J. WILLIAMOWSKY, *Primary Examiner.*

L. H. GERIN, *Assistant Examiner.*